United States Patent
Kiefer et al.

(10) Patent No.: US 12,378,805 B2
(45) Date of Patent: Aug. 5, 2025

(54) FASTENING DEVICE FOR A WINDOW LIFTER, AND WINDOW LIFTER

(71) Applicant: Brose Fahrzeugteile SE & Co. Kommanditgesellschaft, Bamberg, Bamberg (DE)

(72) Inventors: Dominik Kiefer, Stegaurach (DE); Michael Trautmann, Neudrossenfeld (DE); Michael Blaschke, Ebern (DE); Matthias Fischer, Michelau (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 18/641,650

(22) Filed: Apr. 22, 2024

(65) Prior Publication Data
US 2024/0309690 A1 Sep. 19, 2024

Related U.S. Application Data

(63) Continuation of application No. PCT/EP2022/079095, filed on Oct. 19, 2022.

(30) Foreign Application Priority Data

Oct. 21, 2021 (DE) .................. 10 2021 211 902.6

(51) Int. Cl.
*E05D 15/16* (2006.01)
*B60J 1/00* (2006.01)
*E05F 15/689* (2015.01)

(52) U.S. Cl.
CPC ............ *E05D 15/165* (2013.01); *B60J 1/006* (2013.01); *E05F 15/6916* (2024.01);
(Continued)

(58) Field of Classification Search
CPC ..... E05D 15/165; B60J 1/006; E05F 15/6916; E05F 11/382; E05F 15/6909;
(Continued)

(56) References Cited

U.S. PATENT DOCUMENTS

| 7,055,284 B2 * | 6/2006 | Napoli .................. E05F 15/689 49/362 |
| 8,069,610 B2 * | 12/2011 | Graf ...................... E05F 11/382 49/212 |

(Continued)

FOREIGN PATENT DOCUMENTS

| DE | 3817260 A1 * | 5/1988 |
| DE | 102008015121 B4 | 10/2013 |

(Continued)

*Primary Examiner* — Daniel P Cahn
*Assistant Examiner* — Patrick B. Ponciano
(74) *Attorney, Agent, or Firm* — Laurence A. Greenberg; Werner H. Stemer; Ralph E. Locher

(57) ABSTRACT

A fastening device for a vehicle window lifter, having at least one guide rail for slidable guidance of a carrier for a window glass, includes a pivot piece with a base body and two pivot pins which are formed thereon along a rotational axis and have two parallel planar surfaces. The pivot pin or each pivot pin has an axial notch. The guide rail has a connecting portion with mutually aligned pivot grooves for receiving and pivotably mounting the pivot pins of the pivot piece. A vehicle window lifter for adjusting a window glass of a motor vehicle, is also provided.

14 Claims, 5 Drawing Sheets

(52) U.S. Cl.
CPC ..... *E05Y 2600/62* (2013.01); *E05Y 2600/622* (2013.01); *E05Y 2900/55* (2013.01)

(58) Field of Classification Search
CPC ............. E05F 15/6914; E05Y 2600/62; E05Y 2600/622; E05Y 2600/528; E05Y 2600/53; E05Y 2900/55; E05Y 2201/684
USPC .......................................................... 49/212
See application file for complete search history.

(56) References Cited

U.S. PATENT DOCUMENTS

| | | | | |
|---|---|---|---|---|
| 8,240,086 | B2 * | 8/2012 | Mangold | E05F 11/385 |
| | | | | 49/375 |
| 10,619,396 | B2 * | 4/2020 | Kapuskar | E05F 15/695 |
| 11,208,838 | B2 * | 12/2021 | Robison | E05D 15/165 |
| 11,319,742 | B2 * | 5/2022 | Bose | E05F 11/483 |
| 11,674,348 | B2 * | 6/2023 | Krieger | E05F 15/689 |
| | | | | 49/352 |
| 11,788,335 | B2 * | 10/2023 | Trautmann | E05F 11/382 |
| | | | | 49/348 |
| 2004/0211122 | A1 | 10/2004 | Freymuth et al. | |
| 2006/0254146 | A1 * | 11/2006 | Florentin | E05F 11/382 |
| | | | | 49/348 |
| 2024/0309690 | A1 * | 9/2024 | Kiefer | E05F 11/382 |

FOREIGN PATENT DOCUMENTS

| | | | | |
|---|---|---|---|---|
| DE | 102017103629 A1 * | 8/2018 | ............ | E05F 11/382 |
| DE | 102019215093 B3 * | 3/2021 | ............ | E05F 11/382 |
| DE | 202023104174 U1 * | 12/2024 | | |

* cited by examiner

FASTENING DEVICE FOR A WINDOW LIFTER, AND WINDOW LIFTER

CROSS-REFERENCE TO RELATED APPLICATION

This application is a continuation, under 35 U.S.C. § 120, of copending International Patent Application PCT/EP2022/079095 filed Oct. 19, 2022, which designated the United States; this application also claims the priority, under 35 U.S.C. § 119, of German Patent Application DE 10 2021 211 902.6, filed Oct. 21, 2021; the prior applications are herewith incorporated by reference in their entirety.

FIELD AND BACKGROUND OF THE INVENTION

The invention relates to an in particular pivoting fastening device for a window lifter (vehicle window lifter) with at least one guide rail for the slidable guidance of a carrier for a window glass, and with a pivot piece. The invention furthermore relates to a window lifter (vehicle window lifter) for adjusting a window glass of a motor vehicle, with such a fastening device.

Movable vehicle windows are usually moved between a closed position and an open position by electric motor operated adjustment devices as (vehicle) window lifters. Such a window lifter usually includes an electric motor operated actuator and an adjustment mechanism connecting or coupling the actuator to the window glass, which are assigned to the motor vehicle door or motor vehicle body.

The adjustment mechanism is for example mechanically connected to the movable window glass by at least one carrier, also described as a rail slide. The carrier or rail slide as a window guide element is typically connected to the window glass in the region of a lower edge thereof and connected to the electric motor operated actuator via a flexible cable pull (traction cable); it can then be adjusted along the guide rail in order to move the window glass along the adjustment path between the closed position and the open position.

A fastening device for a window lifter (vehicle window lifter) is known from German Patent DE 10 2019 215 093 B3, corresponding to U.S. Pat. No. 11,788,335 B2, and includes at least one guide rail for slidable guidance of a carrier for a window glass, with a pivot piece having two pivot pins which are formed on a base body of the pivot piece and lie axially opposite one another along a rotational axis, and a fastening bolt. A connecting portion of the guide rail has mutually aligned pivot grooves for receiving the pivot pins and for pivotable mounting of the pivot piece, and a passage opening for the fastening bolt. The mutually aligned pivot grooves are open at the top so that the pivot pins of the pivot piece can be inserted in the connecting portion at the upper rail end, and the pivot pins of the pivot piece and the pivot grooves on the rail side form a pivot joint.

In order to produce the pivot joint, the pivot piece is joined to the connecting portion of the guide rail in that the pivot pins have two parallel planar surfaces, and the pivot grooves have a narrow point and adjoining the narrow point a groove portion or groove base in the form of a ball socket for receiving the respective pivot pin of the pivot piece. In that way, the pivot pins on the pivot piece side, which have two mutually opposite pivot sides, can be introduced into the socket-like groove portions or bases of the pivot grooves in the corresponding orientation.

SUMMARY OF THE INVENTION

It is accordingly an object of the invention to provide a fastening device for a window lifter, which overcomes the hereinafore-mentioned disadvantages of the heretofore-known devices of this general type and which allows a secure and firm seat of the slide piece on the proper rail interface. Preferably, additionally or alternatively, as great a tolerance compensation as possible is achieved upon fluctuations of the rail interface, in particular of the clear width of the narrow point of the rail-side pivot joints and/or their socket-like groove portions (groove bases). The invention is furthermore based on the object of indicating a window lifter (vehicle window lifter) with such a fastening device which is particularly suited for adjustment of a window glass of a motor vehicle.

With the foregoing and other objects in view there is provided, in accordance with the invention, a fastening device provided and configured for a vehicle window lifter with at least one guide rail for slidable guidance of a carrier for a window glass. The fastening device has a pivot piece, preferably made or formed of plastic, with a base body and two pivot pins formed thereon which lie axially opposite one another along a rotational axis.

Each pivot pin of the pivot piece has two parallel planar surfaces. In other words, the pivot pins have two flat sides opposite and spaced from one another. Also, the or each pivot pin has an axial notch. In other words, the respective pivot pin—relative to the rotational axis—has a recess or axial groove running in the longitudinal direction, which extends from the one planar or flat side into the other planar or flat side of the pivot pin. Suitably, the pivot pins of the pivot piece have two mutually opposite, in particular rounded, preferably arcuate, pivot sides as pivot faces.

The guide rail has a connecting portion with mutually aligned pivot grooves each for receiving and pivotably mounting a respective pivot pin of the pivot piece. Preferably, these pivot grooves form the rail-side interface (rail interface) for the pivot piece or its pivot pins. Particularly suitably, the pivot grooves have an inlet portion and a narrow point adjoining this in the groove longitudinal direction, or in the axial direction relative to the rotational axis of the pivot piece, which is in turn followed by a socket-like, in particular hole-like groove portion, also referred to below as the groove base.

Advantageous embodiments and refinements are the subject of the dependent claims. The advantages and preferred embodiments presented with respect to the fastening device are transferrable accordingly to the vehicle window lifter and vice versa.

During mounting of the pivot piece, the pivot pins are inserted in the socket-like groove bases with their planar sides past the narrow point of the rail-side pivot groove. Then the pivot piece can be swiveled through around 90° so that the pivot pins lie in the pivot grooves with a firm seat, and the pivot piece sits captively and pivotably in the rail-side pivot grooves.

The material weakening of the pivot pins caused by the notch leads to a spring effect of the respective pivot pin. This effect is particularly influential in the mounting position of the pivot joint, allowing a reaction to fluctuations of the rail interface, in particular with respect to the hole or opening diameter and/or a hole or opening out-of-roundness on the rail-side pivot grooves. But also on insertion of the pivot pin of the pivot piece in the rail-side pivot grooves, the spring effect of the respective pivot pin allows compensation for tolerance-induced fluctuations in the clear width in the region of the rail-side narrow points. Also, the notches or axial grooves in the pivot pin allow separation of the tasks of firm seating and/or tolerance compensation.

In an advantageous embodiment, at least one of the pivot pins of the pivot piece is formed as an eccentric. Suitably, both pivot pins are formed as eccentrics. This may be achieved as a material application of or onto the pivot pins. This eccentricity of the pivot pins allows play-free mounting of the pivot piece on the guide rail or its connecting portion or rail interface. Also, the eccentrics minimize noise in or at the bearing points.

In a suitable refinement, a stop edge is formed on at least one of the pivot pins, preferably on both pivot pins. This serves for supporting the pivot piece on at least one of the groove legs of the corresponding pivot groove. Suitably, on its free end side, the or each pivot pin has a step or a preferably stepped pin portion with reduced cross-sectional area. In particular, this stepping of the pivot pin (also referred to below as a rib on the outside) serves as a representative indicator measure for quality control, for example in series production. A chamfer with an angle of e.g. 2.2° is applied on the planar pin surface from the inner edge to the outer edge. This results from the punching chamfer in series production, whereby the hole diameter on the leg inside of the (guide) rail is smaller than on the rail or leg outside. This aspect or effect is countered by the chamfer created by the rib on the outside or by the stepping or tapering, in particular so that measurements can establish whether this chamfer is present and/or its dimension or extent lies within the tolerance range.

In a suitable refinement, the axial notch depth (groove depth) of the notch (axial groove) of the or each pivot pin amounts to at least 50% of the axial length of the respective pivot pin. Preferably, the notch depth amounts to 60% to 80%, particularly preferably (65±5)%. With increasing notch depth (groove depth) of the notch (axial groove) of the or each pivot pin, the spring effect also increases. This allows for example a reaction to different material thicknesses or configurations of the guide rail. Suitably, the notch width (groove width) of the notch (axial groove) of the or each pivot pin amounts to at least 15%, preferably 20% to 40%, particularly preferably (25±5)% of the (pin) width of the respective pivot pin.

In a further embodiment, the opening of the pivot piece is configured as a passage opening with internal thread. In other words, the base body of the pivot piece has an internally threaded opening. This serves to receive a fastening bolt which has a shank portion with a corresponding external thread. A tool opening on the end of the fastening bolt allows the fastening bolt to be screwed into the opening of the pivot piece or its base body. Also, the fastening bolt may be configured with an threadless shank portion, and the fastening bolt held in the opening of the pivot piece by a press-fit or by substance bonding.

With the objects of the invention in view, there is concomitantly provided a vehicle window lifter for adjusting a window glass of a motor vehicle, having at least one guide rail, preferably two mutually parallel guide rails, and the fastening device with the connecting portion on the rail end side. Suitably, an adjustment or setting device is provided on the rail end opposite the connecting portion, for example in the form of a screw bolt. In this case, as described in German Patent DE 10 2019 215 093 B3, corresponding to U.S. Pat. No. 11,788,335 B2, cited initially, the respective guide rail may be adjusted in the vehicle transverse direction (Y direction) and for this purpose the upper pivot joint of the fastening device can be pivoted. The maximum adjustment travel is in this case preferably limited by the pivot travel of the pivot piece, which can or may in turn be determined by the spacing or pivot arc of a stop ring of the fastening bolt from the connecting portion of the guide rail.

Other features which are considered as characteristic for the invention are set forth in the appended claims.

Although the invention is illustrated and described herein as embodied in a fastening device for a window lifter, and a window lifter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
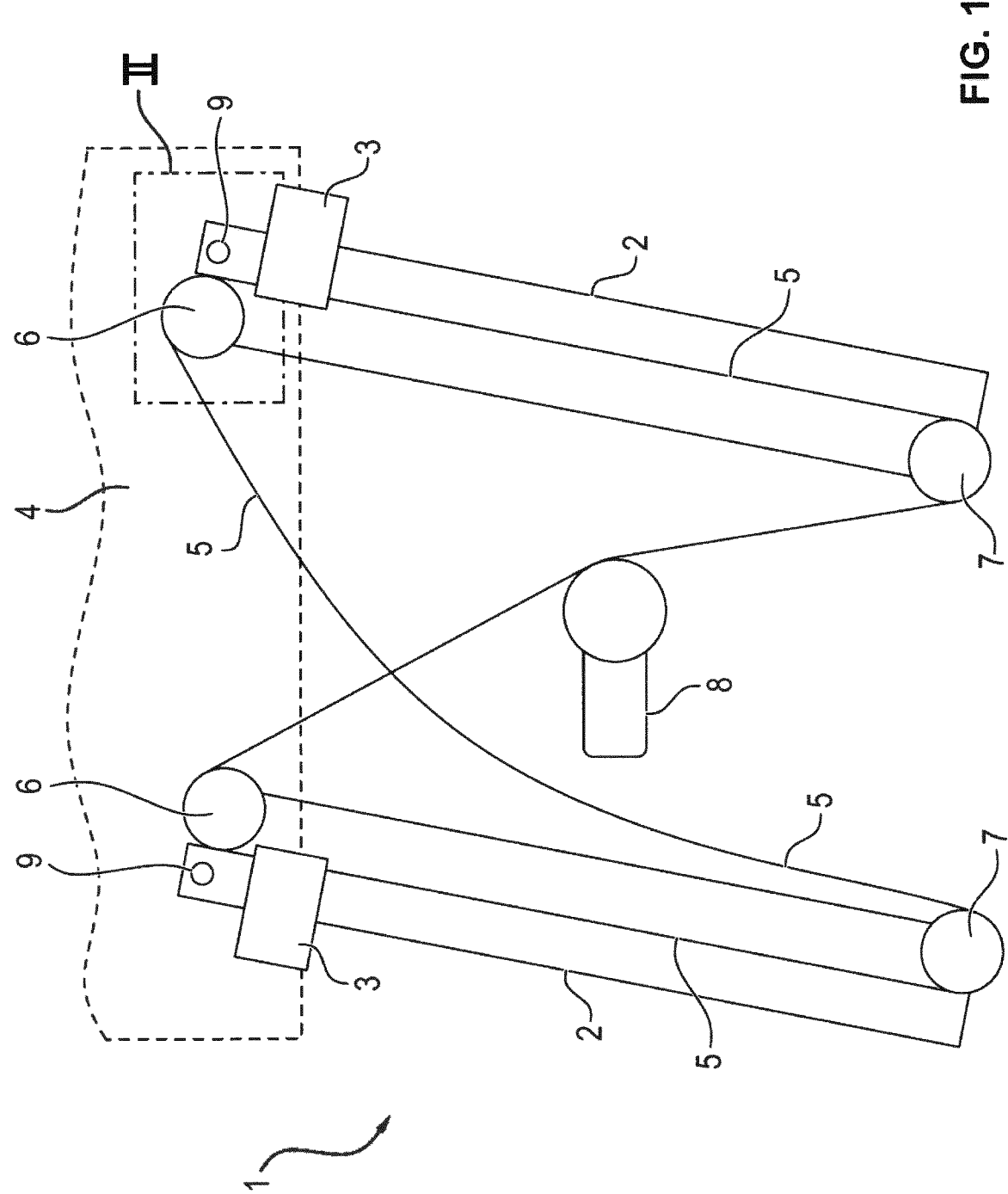
FIG. 1 is a fragmentary, diagrammatic, perspective view a vehicle window lifter with an electric motor operated cable drive and an adjustment mechanism, and with two guide rails each with a pivotable fastening device.

Referring now in detail to the figures of the drawings, in which corresponding parts and dimensions always carry the same reference signs, and first, particularly, to FIG. 1 thereof, there is seen a (cable) window lifter 1 for a motor vehicle (vehicle window lifter). In the exemplary embodiment, a double-row cable window lifter is shown with two parallel guide rails 2, on which carriers or rail slides 3 are slidably guided. A window glass 4 is held, e.g. clamped, to the carriers 3. The carriers 3 are connected to a cable pull 5 which is guided over upper and lower deflector elements 6 and 7, in particular deflector rollers, and coupled to an electric motor operated actuator or cable drive 8. A rotational movement of the electric motor operated cable drive 8 leads to a travel of the window glass 4 into an open position or, in the opposite direction, into a closed position of the window glass 4.

A pivotably movable fastening device 9 is provided on the upper rail end of at least one of the guide rails 2. This allows, in particular with a frameless vehicle door, an upper glass portion or upper glass edge of the vehicle glass 4 to bear or press against a seal (on the vehicle roof side) with a predefined or specific contact pressure.

Figure 2:
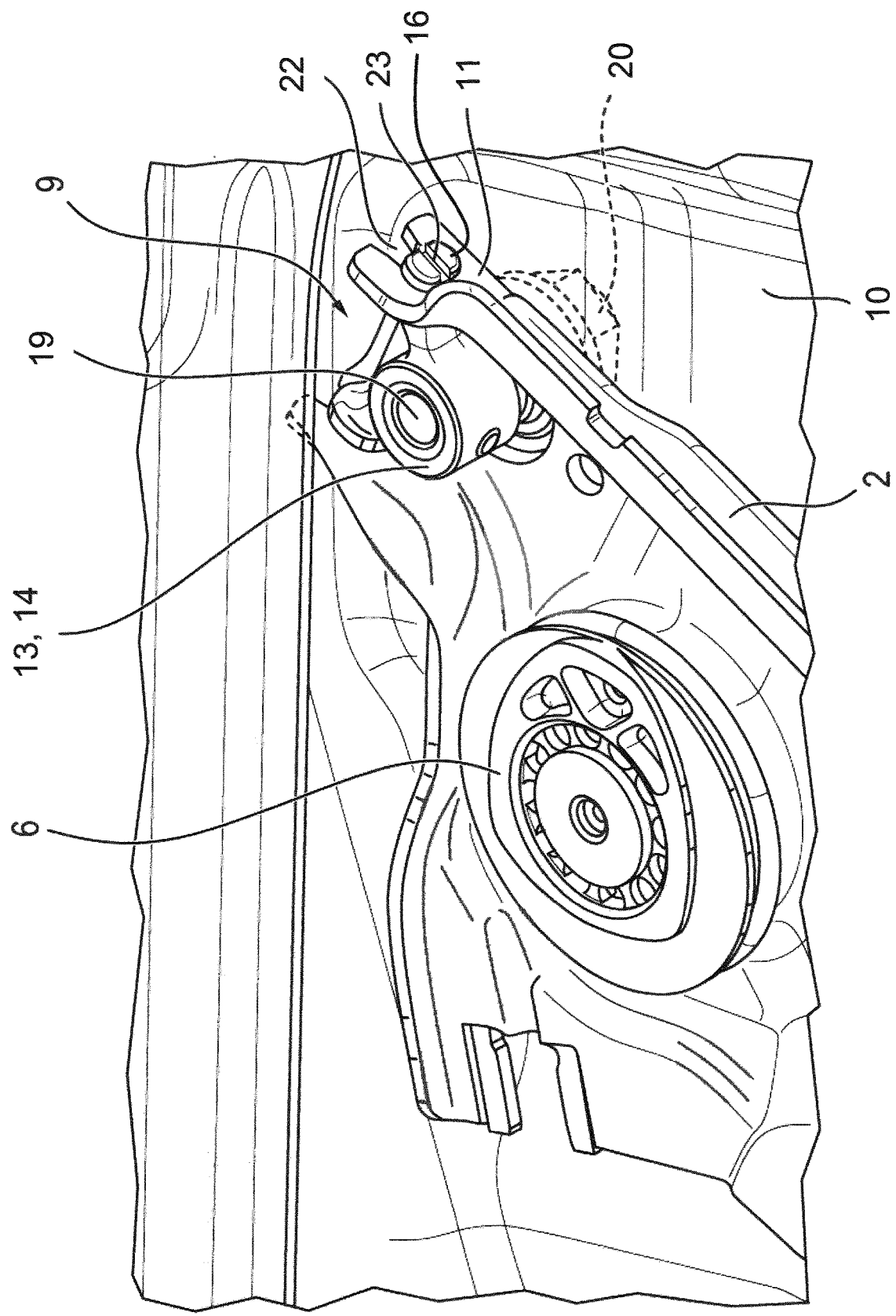
FIG. 2 is an enlarged perspective view of an excerpt II from FIG. 1 with a frame or module part and with a fastening device with an (upper) connecting portion of one of the guide rails, and a pivot piece pivotably mounted thereon with an inserted fastening bolt.

FIG. 2 shows in perspective an excerpt II of the fastening device 9 on a frame or module part 10, in particular a plate-like module or assembly carrier or carrier module of a vehicle door, in a front view of a screw fastening of the guide rail 2 or its connecting portion 11 onto the module part 10 by a threaded nut 20. The connecting portion 11 is preferably an integral (one-piece) component of the guide rail 2.

Figure 3:
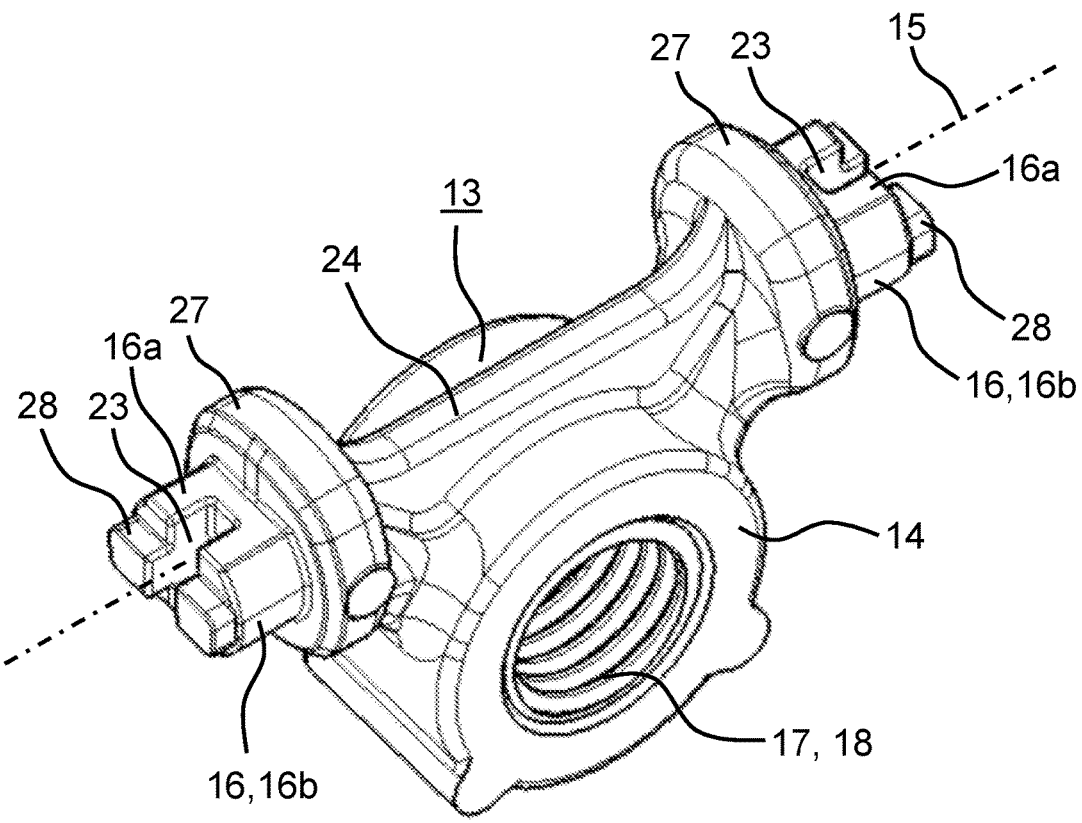
FIG. 3 is a further enlarged perspective view of the pivot piece with a base body and pivot pins formed thereon with axial notches (axial grooves)
Figure 5A:
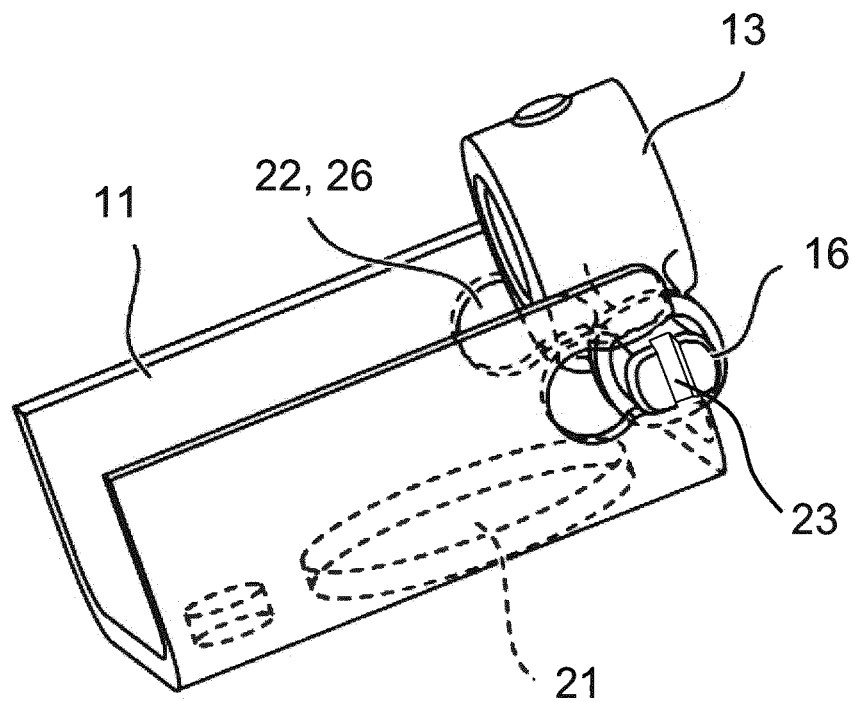
FIGS. 5*a* to 5*c* are perspective views showing different joining positions of the pivot piece which has been inserted into the pivot grooves of the guide rail or its connecting portion as a (mechanical) rail interface, and pivoted.
Figure 5B:
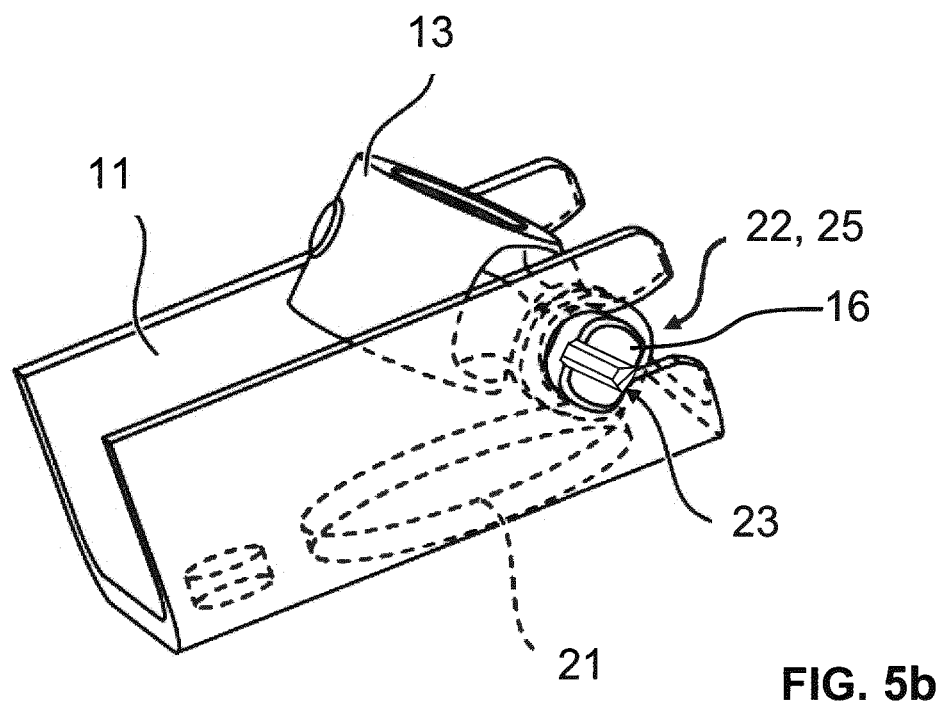
Figure 5C:
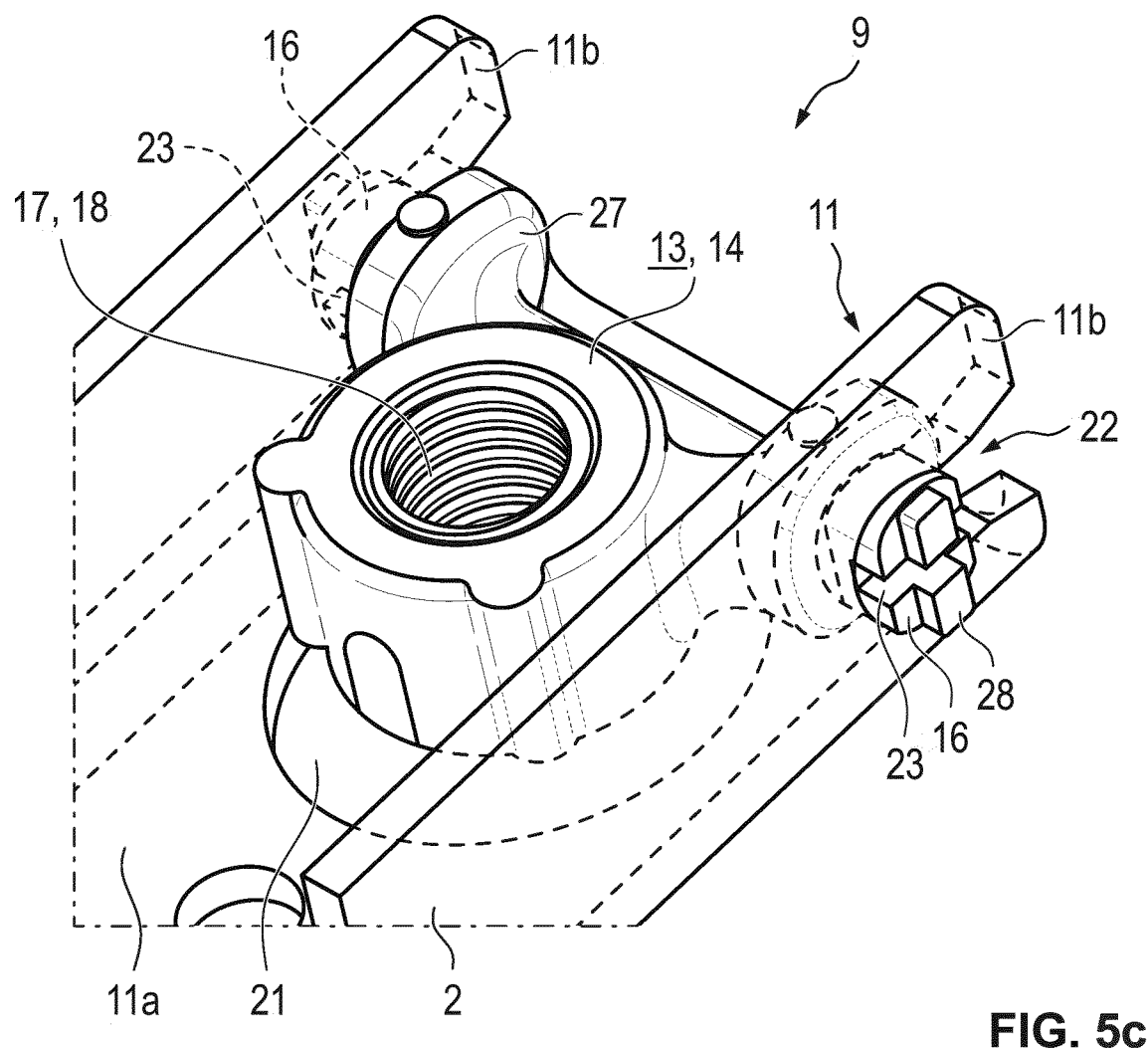

As is comparatively clearly evident in connection with FIGS. 3 and 5c, the fastening device 9 has a pivot piece 13 with a base body 14, on which two pivot pins 16 are formed which lie axially opposite one another along a rotational axis 15 (FIG. 3). In this exemplary embodiment, the pivot piece 13 or its base body 14 has a passage opening 17 with an internal thread (internally threaded opening) 18.

Furthermore, in the exemplary embodiment, the fastening device 9 has a fastening bolt 19, or is provided and/or configured for receiving such. The fastening bolt 19 has an external thread (not visible here) corresponding to the internal thread 18 on the pivot piece side. On the side of the guide rail 2 or the connecting portion 11 facing away from the pivot piece 13 or its base body 14 and towards the module part (carrier module) 10, the fastening bolt 19 carries the threaded nut 20 for screw fastening of the guide rail 2 or its connecting portion 11 to the module part 10.

The connecting portion 11 is U-shaped in cross-section and includes a connecting leg 11a and two lateral legs 11b (FIG. 5c). A passage opening 21 is made in the connecting leg 11a and aligns with the (internally threaded) opening 17 of the pivot piece 13 in its inward-pivoted position illustrated in FIG. 5c. The lateral legs 11b have mutually aligned pivot grooves 22 for receiving the pivot pins 16 of the pivot piece 13. The pivot grooves 22 on the rail or connection side form a (mechanical) interface as part of the fastening device 9. The base body 14 of the pivot piece 13 can be pivoted between the lateral legs 11b in the direction of the connecting leg 11a, and in the inward-pivoted state are mounted in the connecting portion 11 so as to be pivotable about the rotational axis 15.

The mutually aligned pivot grooves 22 of the two lateral legs 11b are open at the top in the mounting state of the window lifter 1, so that the pivot pins 16 of the pivot piece 13 can be inserted in the connecting portion 11 at the upper rail end of the guide rail 2, as will be described in more detail below with reference to FIGS. 5a to 5c. The pivot pins 16 of the pivot piece 13 form a pivot joint with the pivot grooves 22 of the connecting portion 11. The rail-side connecting portion 11 and/or its pivot grooves 22 form the interface for the pivot piece 13 of the fastening device 9.

As is comparatively clearly evident from FIGS. 3, 4 and 5c, the pivot pins 16 have an (axial) notch 23, referred to below as an axial groove.

FIG. 3 shows in perspective a preferred embodiment of the pivot piece 13, preferably made of a plastic. The pivot piece 13 therein has a cylindrical base body 14. The pivot pins 16 are provided on the end of a pivot web 24 formed on the casing side of the base body 14 and running tangentially thereto. The pivot pins 16 of the pivot piece 13 have two mutually opposite flat sides 16a as guide surfaces. Their mutual spacing corresponds to the clear width at the narrow point 25 (FIG. 5b) between the groove flanks of the respective pivot groove 22 on the rail or interface side. In other words, the thickness measured between the flat sides or planar surfaces 16a of the respective pivot pin 16 corresponds to the width of the pivot groove 22 at its narrow point 25 (FIG. 5b). In this way, the pivot pins 16 can be inserted in the pivot grooves 22 and past the narrow point 25 into a rounded or hole-like groove base or groove portion 26. The pivot pins 16 of the pivot piece 13 have two mutually opposite, in particular arcuate, rounded pivot sides 16b as pivot or sliding faces. On the free end side, the respective pivot pin 16 has a stepped pin portion 28 with reduced cross-sectional area, through which the respective axial groove or notch 23 passes.

The pivot pins 16 of the pivot piece 13 are configured as eccentrics. This may be achieved by material application of or onto the pivot pins 16. Suitably, both pivot pins 16 are eccentric. The eccentricity of the pivot pins 16 allows play-free mounting of the pivot piece 13 on the guide rail 2 or its connecting portion 11 in the pivot grooves 22, i.e. on or in the rail-side interface of the fastening device 9. Also, the eccentrics minimize noise at or in the bearing points formed by the groove base or the socket-like groove portion 26 of the respective pivot grooves 22.

A stop edge 27 is formed on the pivot pins 16. This serves to support the pivot piece 13 on the groove leg of the corresponding pivot groove 22 of the (lateral) leg 11b on the rail or connection side.

Figure 4:
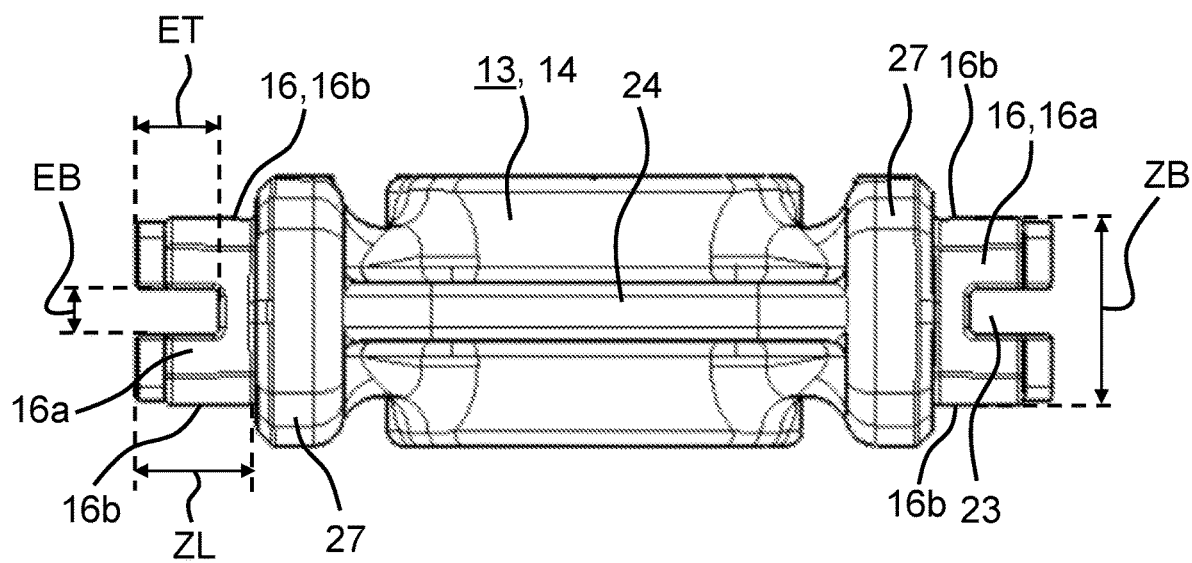
FIG. 4 is a plan view of the pivot piece as viewed onto a pivot web formed on the base body between the end-side pivot pins.

As is illustrated in FIG. 4, the axial notch or groove depth ET of the notch 23 of the pivot pin 16 preferably amounts to (65±5)% of the axial pin length ZL of the respective pivot pin 16. The notch or groove width EB of the notch or axial groove 23 of the or each pivot pin 16 suitably amounts to (25±5)% of the pin width ZB of the respective pivot pin 16.

The sequence of joining positions illustrated in FIGS. 5a to 5c shows the production or formation of the pivot joint of the pivot piece 13 in the connecting portion 11 of the guide rail 2, or in or on the rail-side interface. According to FIG. 5a, the pivot piece 13 is inserted with the pivot pins 16 oriented relative to the rail-side pivot grooves 22 in such a way that the flat sides or planar surfaces 16a of the pivot pins 16 face the groove-side narrow point 25 and pass this, so that the pivot pins 16 can be introduced into the socket-like groove base 26 (FIG. 5b).

Then the pivot piece 13, introduced in a corresponding orientation into the pivot grooves 22 as far as the groove base 26, can be pivoted by rotational movement into the receiving space between the lateral legs 11b in the direction of the connecting leg 11a of the connecting portion 11 (FIG. 5c). In this position, the opening 17 of the pivot piece 13 or its base body 14 aligns with the passage opening 21, provided for the fastening bolt 19, in the connecting leg 11a of the connecting portion 11 or the guide rail 2. In this position, the pivot piece 13 is rotationally movable about the rotational axis 15, and the pivot pins 16 lie in the pivot grooves 22 with a firm seat.

The groove base or portion 26 of the respective pivot groove 22 has an arc over an angle of more than 180° and preferably less than 270°. During this pivoting, the pivot pins 16 of the pivot piece 13 engage in the socket-like groove bases or groove portions 26 of the pivot grooves 22 by overcoming the friction force predefined by the groove and pin geometry. This achieves a captive (firm) seat of the pivot piece 13 which is pivoted inward between the legs 11b of the connecting region 11.

The material weakening caused by the notch (axial groove) 23 causes a spring effect of the respective pivot pin 16. This allows a reaction to fluctuations of the connecting point 11 as a rail interface with respect to the hole or opening diameter, or a hole or opening out-of-roundness of the rail-side pivot grooves 22. Also, upon insertion of the pivot pin 16 into the rail-side pivot grooves 22, the spring effect of the pivot pins 16 allows compensation for e.g. tolerance-induced fluctuations in the region of the rail-side narrow points 25. Also, the axial notches 23, or notches oriented in the longitudinal direction of the rotational axis 15, in the pivot pins 16 allow separation of the tasks of firm seating and tolerance compensation.

To summarize, the invention concerns a fastening device 9 for a window lifter (vehicle window lifter) 1 with at least one guide rail 2 for the slidable guidance of a carrier 3 for a window glass 4, wherein the fastening device 9 has a pivot piece 13 with two pivot pins 16 formed thereon which lie axially opposite one another along a rotational axis 15, and—preferably each—with an axial groove or (axial) notch 23 extending in the longitudinal direction relative to the rotational axis 15. The guide rail 2 has a connecting portion 11, preferably formed as one piece, which serves as an interface of the fastening device 9 for the pivot piece 13, wherein legs 11*b* on the rail or connection side have mutually aligned pivot grooves 22 for receiving the pivot pins 16 of the pivot piece 13 for pivotable mounting thereof.

The claimed invention is not restricted to the above-described exemplary embodiments. Rather, other variants of the invention may be derived by the person skilled in the art within the scope of the recited claims, without leaving the subject of the claimed invention. In particular, furthermore, all individual features described in connection with the various exemplary embodiments may be combined in other ways within the scope of the recited claims, without leaving the subject of the claimed invention. Thus, for example, the fastening bolt 19 may be formed on the pivot piece 13.

Also, the described solution may be used not only in the specifically illustrated application, but also in similar configurations for other automotive applications, such as e.g. for door or tailgate systems, for single-row window lifters, vehicle locks and adjustable seat and interior systems.

The following is a summary list of reference numerals and the corresponding structure used in the above description of the invention:

1 Window lifter
2 Guide rail
3 Carrier/rail slide
4 Window glass
5 Cable pull
6 Upper deflector roller/deflector element
7 Lower deflector roller/deflector element
8 Actuator/cable drive
9 Fastening device
10 Module part/carrier/carrier module
11 Connecting portion/interface
11*a* Connecting leg
11*b* Leg
12 Threaded nut
13 Pivot piece
14 Base body
15 Rotational axis
16 Pivot pin
16*a* Flat side/planar surface
16*b* Pivot side
17 Passage/opening
18 Internal thread
19 Fastening bolt
20 Threaded nut
21 Passage opening
22 Pivot groove
23 Notch/axial groove
24 Pivot web
25 Narrow point
26 Groove base/portion/bearing point
27 Stop edge
28 Pin portion
EB Notch/groove width
ET Notch/groove depth
ZB Pin width
ZL Pin length

The invention claimed is:

1. A fastening device for a vehicle window lifter having a guide rail for slidable guidance of a carrier for a window glass, the fastening device comprising:
   a pivot piece having a base body and two pivot pins formed on said base body;
   said pivot pins lying axially opposite one another along a rotational axis and said pivot pins each having two respective parallel planar surfaces;
   at least one of said pivot pins having an axial notch formed therein; and
   a connecting portion associated with said guide rail, said connecting portion having pivot grooves formed therein, said pivot grooves being mutually aligned, and said pivot grooves each being configured for receiving and pivotably mounting a respective one of said pivot pins of said pivot piece.

2. The fastening device according to claim 1, wherein said axial notch extends between said two respective parallel planar surfaces.

3. The fastening device according to claim 2, wherein said pivot pins of said pivot piece each have two mutually opposite pivot sides acting as pivot faces.

4. The fastening device according to claim 3, wherein said pivot sides are rounded or arcuate.

5. The fastening device according to claim 1, wherein said pivot grooves each have respective groove legs, and a stop edge is formed on at least one of said pivot pins for supporting said pivot piece on at least one of said groove legs.

6. The fastening device according to claim 1, wherein at least one of said pivot pins of said pivot piece is formed as an eccentric.

7. The fastening device according to claim 1, wherein:
   said pivot pins each have a pin length and a pin width; and
   at least one of:
      said notch of at least one of said pivot pins has an axial notch depth amounting to at least 50% of said axial pin length of a respective one of said pivot pins, or
      said notch of at least one of said pivot pins has a notch width amounting to at least 15% of said pin width of a respective one of said pivot pins.

8. The fastening device according to claim 1, wherein:
   said pivot pins each have a pin length and a pin width; and
   at least one of:
      said notch of at least one of said pivot pins has an axial notch depth amounting to 60% to 80% of said axial pin length of a respective one of said pivot pins, or
      said notch of at least one of said pivot pins has a notch width amounting to 20% to 40% of said pin width of a respective one of said pivot pins.

9. The fastening device according to claim 1, wherein:
   said pivot pins each have a pin length and a pin width; and
   at least one of:
      said notch of at least one of said pivot pins has an axial notch depth amounting to 65±5% of said axial pin length of a respective one of said pivot pins, or
      said notch of at least one of said pivot pins has a notch width amounting to 25±5% of said pin width of a respective one of said pivot pins.

10. The fastening device according to claim 1, wherein each of said pivot pins has a free end side with a pin portion having a reduced cross-sectional area.

11. The fastening device according to claim 10, wherein said pin portion has a stepped shape.

12. The fastening device according to claim 1, which further comprises a fastening bolt, said base body of said pivot piece having an internally threaded opening for receiving said fastening bolt.

13. The fastening device according to claim 1, wherein said pivot piece is made of plastic.

14. A vehicle window lifter for adjusting a window glass of a motor vehicle, the vehicle window lifter comprising:
   at least one guide rail; and
   a fastening device, including:
      a pivot piece having a base body and two pivot pins formed on said base body;
      said pivot pins lying axially opposite one another along a rotational axis and said pivot pins each having two respective parallel planar surfaces;
      at least one of said pivot pins having an axial notch formed therein; and
      a connecting portion associated with said guide rail, said connecting portion having pivot grooves formed therein, said pivot grooves being mutually aligned, and said pivot grooves each being configured for receiving and pivotably mounting a respective one of said pivot pins of said pivot piece.

* * * * *